(12) United States Patent
Sunagawa et al.

(10) Patent No.: US 6,333,128 B1
(45) Date of Patent: Dec. 25, 2001

(54) LITHIUM SECONDARY BATTERY

(75) Inventors: Takuya Sunagawa; Hiroshi Watanabe; Toshiyuki Nohma; Koji Nishio, all of Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/272,554

(22) Filed: Mar. 19, 1999

(30) Foreign Application Priority Data

Mar. 19, 1998 (JP) .................................................. 10-092734

(51) Int. Cl.⁷ ............................ H01M 4/58; H01M 4/34; H01M 4/36; H01M 4/32; H01M 4/50
(52) U.S. Cl. ................................. 429/231.95; 429/218.1; 429/219; 429/222; 429/223; 429/224; 429/231.6; 429/231.3
(58) Field of Search .................. 429/231.95, 218.1, 429/223, 224, 231.3, 231.6, 219, 222

(56) References Cited

U.S. PATENT DOCUMENTS

| 4,980,080 | * | 12/1990 | Lecerf et al. | 252/182.1 |
| 5,180,574 | * | 1/1993 | Von Sacken | 423/594 |
| 5,264,201 | | 11/1993 | Dahn et al. | 429/594 |
| 5,361,105 | | 11/1994 | Hasegawa et al. | 429/194 |
| 5,631,105 | * | 5/1997 | Hasegawa et al. | 429/194 |
| 5,718,989 | | 2/1998 | Aoki et al. | 429/218 |
| 5,783,333 | | 6/1998 | Mayer | 429/223 |

FOREIGN PATENT DOCUMENTS

| 0806397-A1 | 11/1997 | (EP) . | | |
| 0872450-A1 | 10/1998 | (EP) . | | |
| 0918041A1 | * | 5/1999 | (EP) | C01G/53/00 |
| 05242891A | | 9/1993 | (JP) . | |
| 08037007A | | 2/1996 | (JP) . | |
| 09293497A | | 11/1997 | (JP) . | |
| WO 98/06670 | | 2/1998 | (WO) . | |

OTHER PUBLICATIONS

Patent Abstracts of Japan for JP 10–059725, vol. 098, No. 008, Jun. 30, 1998.
Patent Abstracts of Japan for JP 10–188982, vol. 098, No. 012, Oct. 31, 1998.
Patent Abstracts of Japan for JP 11–054120, vol. 099, No. 005, May 31, 1999.
Patent Abstracts of Japan for JP 11–007958, vol. 099, No. 004, Apr. 30, 1999.

\* cited by examiner

*Primary Examiner*—Steven P. Griffin
*Assistant Examiner*—Jonas N. Strickland
(74) *Attorney, Agent, or Firm*—Birch, Stewart, Kolasch & Birch, LLP

(57) ABSTRACT

The invention provides a positive electrode active material for a lithium secondary battery including a composite oxide powder having a median diameter of 3.0 through 20.0 μm and a content of particles with a grain size of 1 μm or less of 10% by volume or less and being represented by a composition formula, $Li_aCo_bM_cNi_{1-b-c}O_2$, in which M is at least one element selected from the group consisting of B, Mg, Al, Si, Ca, Sc, Ti, V, Cr, Mn, Fe, Cu, Zn, Ga, Ge, Y, Nb, Mo, Ru, Rh, Pd, Ag, Cd, In and Sn; $0 \leq a \leq 1.2$; $0.01 \leq b \leq 0.4$; $0.01 \leq c \leq 0.4$; and $0.02 \leq b+c \leq 0.5$. Thus, the lithium secondary battery can be improved in its charge-discharge cycle characteristic.

16 Claims, 1 Drawing Sheet

LITHIUM SECONDARY BATTERY

BACKGROUND OF THE INVENTION

This application claims the priority of Japanese Patent Application No. 10-92734 fled on Mar. 19, 1998, which is incorporated herein by reference.

The present invention relates to a lithium secondary battery, and more particularly, it relates to improvement of a positive electrode active material used therein for the purpose of providing a lithium secondary battery with an excellent charge-discharge cycle characteristic.

A lithium secondary battery can be improved in its voltage and capacity by appropriately selecting a positive electrode material because there is no need to consider a water decomposition voltage. Therefore, in accordance with recent development of portable and/or cordless electronic equipment, lithium secondary batteries have been regarded as a promising driving power supply for such electronic equipment.

Lithium cobaltite ($LiCoO_2$) has already been practically used as a positive electrode active material in a lithium secondary battery, and the use results in a battery with a high energy density and a high discharge voltage of the 4-V class. Cobalt, that is, a raw material of lithium cobaltite, is, however, a scarce resource and expensive, and hence, use of lithium nickelate ($LiNiO_2$) in place of lithium cobaltite is now under examination.

Lithium nickelate has, however, a disadvantage that the capacity of a battery including this material is largely degraded through charge-discharge cycles because its crystal structure is less stable than that of lithium cobaltite.

As a positive electrode active material usable for overcoming this problem, a composite oxide obtained by substituting part of nickel atoms included in lithium nickelate with cobalt atoms and manganese atoms is reported (see Japanese Laid-Open Patent Publication No. 8-37007/1996). However, the stability, during charge-discharge cycles, of the crystal structure of this composite oxide is still not sufficient to be used in place of lithium cobaltite.

SUMMARY OF THE INVENTION

In consideration of the aforementioned conventional disadvantages, an object of the invention is providing a lithium secondary battery having an excellent charge-discharge characteristic. This object can be achieved by utilizing a specific positive electrode active material as follows:

The lithium secondary battery of this invention comprises, as a positive electrode active material, a composite oxide powder having a median diameter of 3.0 through 20.0 μm and a content of particles with a grain size of 1 μm or less of 10% by volume or less and being represented by a composition formula, $Li_aCo_bM_cNi_{1-b-c}O_2$, in which M is at least one element selected from the group consisting of B, Mg, Al, Si, Ca, Sc, Ti, V, Cr, Mn, Fe, Cu, Zn, Ga, Ge, Y, Nb, Mo, Ru, Rh, Pd, Ag, Cd, In and Sn; $0 \leq a \leq 1.2$; $0.01 \leq b \leq 0.4$; $0.01 \leq c \leq 0.4$; and $0.02 \leq b+c \leq 0.5$.

Alternatively, the lithium secondary battery of this invention comprises, as a positive electrode active material, a composite oxide powder having a median diameter of 6.0 through 15.0 μm and a content of particles with a grain size of 1 μm or less of 10% by volume or less and being represented by a composition formula, $Li_aCo_bM_cNi_{1-b-c}O_2$, in which M is at least one element selected from the group consisting of B, Mg, Al, Si, Ca, Sc, Ti, V, Cr, Mn, Fe, Cu, Zn, Ga, Ge, Y, Nb, Mo, Ru, Rh, Pd, Ag, Cd, In and Sn; $0 \leq a \leq 1.2$; $0.01 \leq b \leq 0.4$; $0.01 \leq c \leq 0.4$; and $0.02 \leq b+c \leq 0.5$.

Alternatively, the lithium secondary battery of this invention comprises, as a positive electrode active material, a composite oxide powder having a median diameter of 3.0 through 20.0 μm and a content of particles with a grain size of 1 μm or less of 10% by volume or less and being represented by a composition formula, $Li_aCo_bM_cNi_{1-b-c}O_2$, in which M is at least one element selected from the group consisting of B, Mg, Al, Ca, Ti, V, Mn, Fe, Cu, Zn and Ga; $0 \leq a \leq 1.2$; $0.01 \leq b \leq 0.4$; $0.01 \leq c \leq 0.4$; and $0.02 \leq b+c \leq 0.5$.

Alternatively, the lithium secondary battery of this invention comprises, as a positive electrode active material, a composite oxide powder having a median diameter of 6.0 through 15.0 μm and a content of particles with a grain size of 1 μm or less of 10% by volume or less and being represented by a composition formula, $Li_aCo_bM_cNi_{1-b-c}O_2$, in which M is at least one element selected from the group consisting of B, Mg, Al, Ca, Ti, V, Mn, Fe, Cu, Zn and Ga; $0 \leq a \leq 1.2$; $0.01 \leq b \leq 0.4$; $0.01 \leq c \leq 0.4$; and $0.02 \leq b+c \leq 0.5$.

Owing to these features of the composite oxide powder according to the invention, a lithium secondary battery having an excellent charge-discharge cycle characteristic can be obtained.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

The FIGURE is a sectional view of a lithium secondary battery manufactured in an experiment of the invention.

DETAILED DESCRIPTION OF THE INVENTION

Figure 1:
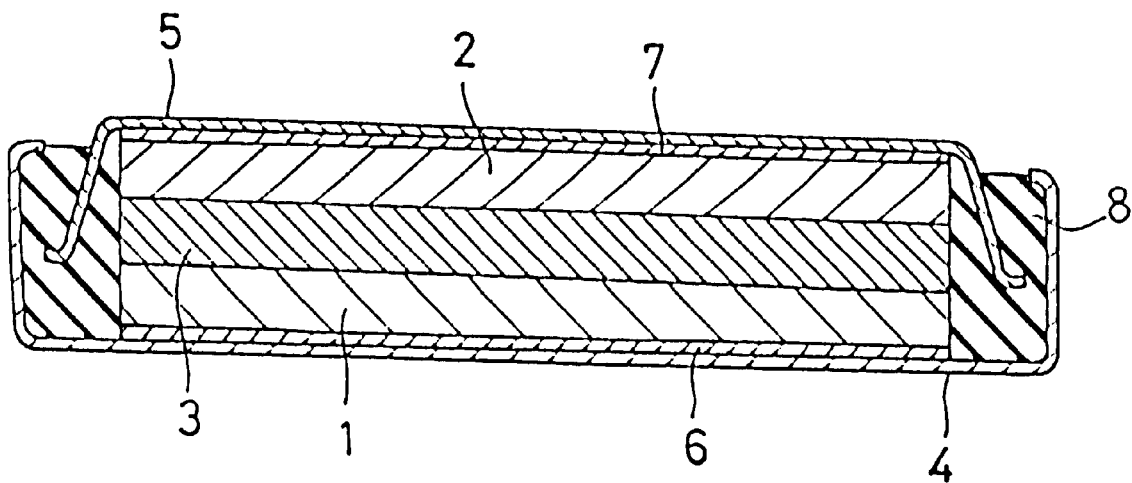

A lithium secondary battery according to the invention comprises, as a positive electrode active material, a composite oxide powder having a median diameter of 3.0 through 20.0 μm and a content of particles with a grain size of 1 μm or less of 10 % by volume or less and represented by a composition formula, $Li_aCo_bM_cNi_{1-b-c}O_2$, in which M indicates at least one element selected from the group consisting of B, Mg, Al, Si, Ca, Sc, Ti, V, Cr, Mn, Fe, Cu, Zn, Ga, Ge, Y, Nb, Mo, Ru, Rh, Pd, Ag, Cd, In and Sn; $0 \leq a \leq 1.2$; $0.01 \leq b \leq 0.4$; $0.01 \leq c \leq 0.4$; and $0.02 \leq b+c \leq 0.5$. A median diameter is a grain size attained at frequency of 50% on a frequency curve, and is used as a kind of average grain sizes.

The composite oxide powder having the aforementioned composition is used in this invention because this composite oxide powder is less degraded in its crystal structure through repeated occlusion and discharge of lithium ions during charge-discharge cycles. A composite oxide powder represented by a composition formula, $Li_aCo_bM_cNi_{1-b-c}O_2$, in which M indicates at least one element selected from the group consisting of B, Mg, Al, Ca, Ti, V, Mn, Fe, Cu, Zn and Ga; $0 \leq a \leq 1.2$; $0.01 \leq b \leq 0.4$; $0.01 \leq c \leq 0.4$; and $0.02 \leq b+c \leq 0.5$, is more preferred because its crystal structure is further less degraded during charge-discharge cycles.

The median diameter of the composite oxide powder is specified to 3.0 through 20.0 μm for the following reasons: When the median diameter is smaller than 3.0 μm, the total surface area of the powder is too large to easily react with an electrolyte solution. As a result, a decomposition product of the electrolyte solution is deposited on the particle surfaces of the positive electrode active material, thereby abruptly decreasing the discharge capacity during charge-discharge cycles. On the other hand, when the median diameter exceeds 20.0 μm, the total surface area of the powder is so small that the lithium ions are occluded and discharged in merely a small area during charge-discharge cycles. As a result, the positive electrode active material is abruptly degraded during charge-discharge cycles. More preferably, the composite oxide powder has a median diameter of 6.0 through 15.0 μm.

The content of the particles with a grain size of 1 μm or less in the composite oxide powder is specified to 10% by volume or less for the following reason: When the content of the fine particles with a grain size of 1 μm or less exceeds 10% by volume, the total surface area of the powder is too large to easily react with the electrolyte solution. As a result, the decomposition product of the electrolyte solution is deposited on the particle surfaces of the composite oxide, thereby abruptly decreasing the discharge capacity during charge-discharge cycles.

The composite oxide powder preferably has a specific surface area measured by a BET method of 0.15 through 2.00 m$^2$/g because a lithium secondary battery with an excellent charge-discharge cycle characteristic can be obtained by using such a powder.

The present invention relates to improvement of a positive electrode active material for the purpose of providing a lithium secondary battery with a good charge-discharge cycle characteristic. Accordingly, materials for other members such as a negative electrode and an electrolyte solution can be any of various materials practically used or proposed as materials for conventional lithium secondary batteries.

Examples of the negative electrode material include a material capable of electrochemically occluding and discharging lithium ions and metallic lithium. Examples of the material capable of electrochemically occluding and discharging lithium ions include carbon materials such as graphite (including natural graphite and artificial graphite), coke and an organic baked substance; lithium alloys such as lithium-aluminum alloy, lithium-magnesium alloy, lithium-indium alloy, lithium-tin alloy, lithium-thallium alloy, lithium-lead alloy and lithium-bismuth alloy; and metal oxides and metal sulfides including one of or two or more of tin, titanium, iron, molybdenum, niobium, vanadium and zinc.

An example of the electrolyte solution includes a solution obtained by dissolving an electrolytic salt such as LiPF$_6$, LiClO$_4$, LiCF$_3$SO$_3$ and LiN(CF$_3$SO$_2$)$_2$ in an organic solvent, such as ethylene carbonate, propylene carbonate, butylene carbonate, dimethyl carbonate, diethyl carbonate, methylethyl carbonate, γ-butyrolactone, sulfolane, 1,2-dimethoxyethane, 1,2-diethoxyethane, 1,2-ethoxymethoxyethane, tetrahydrofuran, 2-methyl-1,3-dioxolane, 4-methyl-1,3-dioxolane, dimethyl ether and diethyl ether, in a concentration of 0.7 through 1.5 moles per liter.

Other features of the invention will become more apparent in the course of the following descriptions of exemplary embodiments which are given for illustration of the invention and not intended to be limiting thereof.

Experiment 1

The relationship between the composition of a positive electrode active material and the charge-discharge cycle characteristic was examined as follows:
Preparation of positive electrodes:

Lithium hydroxide (LiOH), nickel hydroxide (Ni(OH)$_2$), cobalt hydroxide (Co(OH)$_2$) and manganese dioxide (MnO$_2$) were mixed in various ratios in mortars, and the resultant mixtures were baked in an atmosphere of oxygen at a temperature of 750° C. for 20 hours. In this manner, sixteen kinds of composite oxides each in the form of a mass were obtained.

Each of the composite oxides was crushed by using a jet mill, thereby preparing a composite oxide powder to be used as a positive electrode active material. Table 1 lists the following features of each composite oxide: An atomic ratio among respective elements (i.e., Li:Ni:Co:Mn), a median diameter (in μm), a content of particles with a grain size of 1 μm or less (in % by volume), and a specific surface area measured by the BET method (in m$^2$/g). The median diameter was obtained through laser diffraction. Also, helium was used as an absorbed substance in the BET method.

TABLE 1

| Battery | Atomic ratio of elements in composite oxide | | | | Median diameter (μm) | Content of particles with size of 1 μm or less (% by volume) | Specific surface area (m$^2$/g) | Charge-discharge cycles |
|---|---|---|---|---|---|---|---|---|
| | Li | Ni | Co | Mn | | | | |
| A1 (invention) | 1.00 | 0.98 | 0.01 | 0.01 | 10.3 | 9.5 | 1.32 | 325 |
| A2 (invention) | 1.00 | 0.79 | 0.01 | 0.20 | 10.5 | 9.2 | 1.51 | 332 |
| A3 (invention) | 1.00 | 0.59 | 0.01 | 0.40 | 9.7 | 9.2 | 1.15 | 340 |
| A4 (invention) | 1.00 | 0.50 | 0.10 | 0.40 | 10.0 | 9.3 | 1.12 | 329 |
| A5 (invention) | 1.00 | 0.79 | 0.20 | 0.01 | 10.9 | 8.9 | 1.26 | 330 |
| A6 (invention) | 1.00 | 0.60 | 0.20 | 0.20 | 10.3 | 9.0 | 0.98 | 329 |
| A7 (invention) | 1.00 | 0.50 | 0.20 | 0.30 | 9.6 | 9.6 | 1.01 | 327 |
| A8 (invention) | 1.00 | 0.59 | 0.40 | 0.01 | 10.2 | 8.9 | 1.22 | 325 |
| A9 (invention) | 1.00 | 0.50 | 0.40 | 0.10 | 11.0 | 8.8 | 1.18 | 331 |

TABLE 1-continued

| Battery | Atomic ratio of elements in composite oxide | | | | Median diameter (μm) | Content of particles with size of 1 μm or less (% by volume) | Specific surface area (m²/g) | Charge-discharge cycles |
|---|---|---|---|---|---|---|---|---|
| | Li | Ni | Co | Mn | | | | |
| B1 (comparison) | 1.00 | 0.50 | 0.45 | 0.05 | 9.2 | 9.2 | 1.54 | 159 |
| B2 (comparison) | 1.00 | 0.50 | 0.05 | 0.45 | 9.5 | 9.7 | 1.25 | 157 |
| B3 (comparison) | 1.00 | 0.45 | 0.15 | 0.40 | 10.1 | 9.6 | 0.86 | 160 |
| B4 (comparison) | 1.00 | 0.45 | 0.40 | 0.15 | 10.7 | 9.5 | 1.23 | 162 |
| B5 (comparison) | 1.00 | 0.90 | 0.00 | 0.10 | 9.9 | 9.4 | 0.94 | 103 |
| B6 (comparison) | 1.00 | 0.90 | 0.10 | 0.00 | 10.6 | 9.0 | 1.16 | 110 |
| B7 (comparison) | 1.00 | 1.00 | 0.00 | 0.00 | 9.8 | 8.9 | 1.04 | 57 |

Each of the composite oxide powders, acetylene black serving as a conducting agent and poly(vinylidene fluoride) serving as a binder were mixed in a ratio by weight of 90:6:4 and kneaded to give a positive electrode mixed material. The positive electrode mixed material was pressed at a pressure of 2 ton/cm², so as to be formed into a disk with a diameter of 20 mm. The resultant disk was heat-treated under vacuum at a temperature of 250° C. for 2 hours. Thus, the positive electrode of each battery was prepared.

Preparation of negative electrode:

A negative electrode was prepared by punching a rolled plate of lithium-aluminum alloy into a disk with a diameter of 20 mm.

Preparation of electrolyte solution:

An electrolyte solution was prepared by dissolving $LiPF_6$ in a mixed solvent including ethylene carbonate and dimethyl carbonate in a ratio by volume of 1:1.

Manufacture of batteries:

Flat type lithium secondary batteries (i.e., batteries A1 through A9 according to the invention and comparative batteries B1 through B7) were manufactured by using the aforementioned positive and negative electrodes and electrolyte solution. The FIGURE is a sectional view of the lithium secondary battery. The lithium secondary battery BA of the FIGURE comprises a positive electrode 1, a negative electrode 2, a separator 3 for separating the positive and negative electrodes, a positive electrode can 4, a negative electrode can 5, a positive electrode collector 6, a negative electrode collector 7 and an insulating packing 8. The positive electrode 1 and the negative electrode 2, opposing each other with the separator 3 impregnated with the electrolyte solution sandwiched therebetween, are housed in a battery can formed by the positive and negative electrode cans 4 and 5. The positive electrode 1 is connected with the positive electrode can 4 through the positive electrode collector 6 and the negative electrode 2 is connected with the negative electrode can 5 through the negative electrode collector 7, so that a chemical energy generated within the battery can be taken out as an electric energy.

Charge-discharge cycle test:

Each battery was subjected to a charge-discharge cycle test, in which the battery was charged at a current density of 0.5 mA/cm² to 4.25 V and discharged at a current density of 0.5 mA/cm² to 2.75 V in each cycle. In this manner, the number of charge-discharge cycles repeated until the discharge capacity became smaller than 90% of that in the first cycle was obtained with regard to each battery. The thus obtained numbers of charge-discharge cycles are also shown in Table 1 above.

It is understood from Table 1 that the present batteries A1 through A9 have remarkably better charge-discharge cycle characteristics than the comparative batteries B1 through B7. This is because the composite oxides used in the present batteries A1 through A9 are more stable in their crystal structures during charge-discharge cycles than the composite oxides used in the comparative batteries B1 through B7.

Experiment 2

Lithium hydroxide, nickel hydroxide, cobalt hydroxide and an M material shown in Table 2 (namely, selected from the group consisting of B, Mg, Al, Si, Ca, Sc, Ti, V, Cr, Fe, Cu, Zn, Ga, Ge, Y, Nb, Mo, Ru, Rh, Pd, Ag, Cd, In and Sn) were mixed in a mortar in an atomic ratio of Li:Ni:Co:M of 1.0:0.6:0.3:0.1, and the resultant mixture was baked in an atmosphere of oxygen at a temperature of 750° C. for 20 hours. Thus, twenty four kinds of composite oxides each in the form of a mass were obtained.

Each of the composite oxides was crushed by using a jet mill, thereby preparing a composite oxide powder. Table 2 also lists a median diameter (in μm), a content of particles with a grain size of 1 μm or less (in % by volume) and a specific surface area (in m²/g) measured by the BET method of each composite oxide powder.

TABLE 2

| Battery | Material of M | Median diameter (μm) | Content of particles with size of 1 μm or less (% by volume) | Specific surface area (m²/g) | Charge-discharge cycles |
|---|---|---|---|---|---|
| A10 (invention) | $H_3BO_3$ | 10.2 | 9.7 | 1.55 | 330 |
| A11 (invention) | $Mg(OH)_2$ | 11.0 | 9.4 | 0.93 | 328 |
| A12 (invention) | $Al(OH)_3$ | 9.8 | 8.9 | 1.26 | 342 |
| A13 (invention) | SiO | 9.7 | 9.6 | 1.07 | 312 |
| A14 (invention) | $Ca(OH)_2$ | 10.9 | 10.2 | 1.32 | 325 |
| A15 (invention) | $Sc_2O_3$ | 10.5 | 10.7 | 1.23 | 308 |

TABLE 2-continued

| Battery | Material of M | Median diameter (μm) | Content of particles with size of 1 μm or less (% by volume) | Specific surface area (m²/g) | Charge-discharge cycles |
|---|---|---|---|---|---|
| A16 (invention) | Ti(OH)$_4$ | 9.5 | 9.7 | 0.84 | 330 |
| A17 (invention) | V$_2$O$_5$ | 10.1 | 10.1 | 1.01 | 331 |
| A18 (invention) | Cr$_2$O$_3$ | 9.9 | 10.0 | 0.93 | 310 |
| A19 (invention) | FeOOH | 10.7 | 9.7 | 1.15 | 339 |
| A20 (invention) | Cu(OH)$_2$ | 10.4 | 11.2 | 0.96 | 328 |
| A21 (invention) | ZnO | 11.0 | 10.7 | 1.24 | 330 |
| A22 (invention) | Ca$_2$O$_3$ | 9.5 | 10.4 | 1.27 | 329 |
| A23 (invention) | GeO$_2$ | 10.4 | 9.7 | 1.38 | 305 |
| A24 (invention) | Y$_2$O$_3$ | 10.3 | 8.8 | 0.75 | 301 |
| A25 (invention) | Nb$_2$O$_5$ | 9.7 | 10.2 | 1.54 | 309 |
| A26 (invention) | MoO$_2$ | 10.0 | 10.3 | 1.33 | 302 |
| A27 (invention) | RuO$_2$ | 10.1 | 10.9 | 0.84 | 304 |
| A28 (invention) | Rh$_2$O$_3$ | 9.9 | 10.7 | 1.45 | 305 |
| A29 (invention) | PdO | 9.7 | 9.7 | 1.22 | 310 |
| A30 (invention) | Ag$_2$O | 11.0 | 10.4 | 0.74 | 301 |
| A31 (invention) | Cd(OH)$_2$ | 10.7 | 9.9 | 1.63 | 302 |
| A32 (invention) | In$_2$O$_3$ | 10.4 | 10.0 | 1.31 | 301 |
| A33 (invention) | SnO | 9.7 | 9.6 | 1.77 | 304 |

Lithium secondary batteries (i.e., present batteries A10 through A33) were manufactured in the same manner as in Experiment 1 except that the aforementioned composite oxide powders were used as the positive electrode active materials for the respective batteries. These batteries were subjected to the charge-discharge cycle test under the same conditions as in Experiment 1, and the obtained numbers of charge-discharge cycles are also shown in Table 2 above.

It is understood from Table 2 that the element M partially substituted in Ni for improving the stability of the composite oxide in charge-discharge cycles can be not only Mn but also B, Mg, Al, Si, Ca, Sc, Ti, V, Cr, Fe, Cu, Zn, Ga, Ge, Y, Nb, Mo, Ru, Rh, Pd, Ag, Cd, In and Sn. Also, it is understood from Tables 1 and 2 that B, Mg, Al, Ca, Ti, V, Mn, Fe, Cu, Zn and Ga are more preferably used as the element M partially substituted in Ni.

Experiment 3

Lithium hydroxide, nickel hydroxide, cobalt hydroxide and manganese dioxide were mixed in a mortar in an atomic ratio of Li:Ni:Co:Mn of 1.0:0.6:0.3:0.1, and the resultant mixture was baked in an atmosphere of oxygen at a temperature of 750° C. for 20 hours. Thus, a composite oxide in the form of a mass represented by a composition formula of LiNi$_{0.6}$Co$_{0.3}$Mn$_{0.1}$O$_2$ was obtained.

This composite oxide was crushed by using a jet mill under various conditions, thereby preparing nine kinds of composite oxide powders. The median diameter, the content of particles with a grain size of 1 μm or less (in % by volume) and the specific surface area (in m²/g) of each of the composite oxide powders are shown in Table 3.

TABLE 3

| Battery | Median diameter (μm) | Content of particles with size of 1 μm or less (% by volume) | Specific surface area (m²/g) | Charge-discharge cycles |
|---|---|---|---|---|
| A34 (invention) | 3.0 | 10.0 | 1.99 | 301 |
| A35 (invention) | 6.0 | 10.0 | 1.72 | 329 |
| A36 (invention) | 12.5 | 8.2 | 1.55 | 332 |
| A37 (invention) | 15.0 | 5.5 | 1.34 | 335 |
| A38 (invention) | 20.0 | 2.1 | 1.27 | 302 |
| B8 (comparison) | 2.2 | 10.0 | 1.97 | 195 |
| B9 (comparison) | 21.4 | 0.5 | 0.74 | 182 |
| B10 (comparison) | 12.6 | 10.5 | 1.18 | 173 |
| B11 (comparison) | 10.5 | 12.0 | 1.24 | 165 |

Lithium secondary batteries (i.e., present batteries A34 through A38 and comparative batteries B8 through B11) were manufactured in the same manner as in Experiment 1 except that the aforementioned composite oxide powders were used as the positive electrode active materials for the respective batteries. These batteries were subjected to the charge-discharge cycle test under the same conditions as in Experiment 1. The thus obtained numbers of charge-discharge cycles are also shown in Table 3 above.

It is understood from Table 3 that the present batteries A34 through A38, each of which has a median diameter of 3.0 through 20.0 μm and a content of particles with a grain size of 1 μm or less of 10 % by volume or less, have better charge-discharge cycle characteristics than the comparative batteries B8 through B11, in which the median diameter or the content of particles with a grain size of 1 μm or less does not fall within the range herein specified. Also, as is shown in Table 3, among the present batteries A34 through A38, the batteries A35 through A37 have particularly good charge-discharge cycle characteristics. Therefore, it is understood that a composite oxide with a median diameter of 6.0 through 15.0 μm is more preferred.

Experiment 4

Lithium hydroxide, nickel hydroxide, cobalt hydroxide and manganese dioxide were mixed in a mortar in an atomic ratio of Li:Ni:Co:Mn of 1.0:0.6:0.3:0.1, and the resultant mixture was baked in an atmosphere of oxygen at a temperature of 750° C. for 20 hours. Thus, a composite oxide in the form of a mass represented by a composition formula of LiN$_{0.6}$Co$_{0.3}$Mn$_{0.1}$O$_2$ was obtained. At this point, the grain sizes of the materials to be used were variously changed so as to adjust the shapes of the resultant composite oxides and pores included therein. Thus, eighteen kinds of composite oxides, each in the form of a mass, different from one another in the median diameter or the specific surface area were obtained.

Each of the thus obtained composite oxides was crushed by using a jet mill, thereby preparing a composite oxide powder. Table 4 lists the median diameter, the content of particles with a grain size of 1 μm or less (in % by volume) and the specific surface area measured by the BET method of each composite oxide powder.

TABLE 4

| Battery | Median diameter (μ m) | Content of particles with size of 1 μ m or less (% by volume) | Specific surface area (m²/g) | Charge-discharge cycles |
|---|---|---|---|---|
| A39 (invention) | 3.0 | 9.9 | 2.00 | 301 |
| A40 (invention) | 3.0 | 10.0 | 2.12 | 275 |
| A41 (invention) | 6.0 | 3.2 | 0.12 | 304 |
| A42 (invention) | 6.0 | 9.8 | 0.15 | 325 |
| A35 (invention) | 6.0 | 10.0 | 1.72 | 329 |
| A43 (invention) | 6.0 | 9.7 | 2.00 | 325 |
| A44 (invention) | 6.0 | 9.9 | 2.05 | 300 |
| A45 (invention) | 12.5 | 3.9 | 0.13 | 297 |
| A46 (invention) | 12.5 | 4.2 | 0.15 | 330 |
| A36 (invention) | 12.5 | 8.2 | 1.55 | 332 |
| A47 (invention) | 12.5 | 8.9 | 2.00 | 323 |
| A48 (invention) | 12.5 | 9.2 | 2.09 | 302 |
| A49 (invention) | 15.0 | 3.1 | 0.13 | 296 |
| A50 (invention) | 15.0 | 4.5 | 0.15 | 342 |
| A37 (invention) | 15.0 | 5.5 | 1.34 | 335 |
| A51 (invention) | 15.0 | 9.5 | 2.00 | 325 |
| A52 (invention) | 15.0 | 9.7 | 2.05 | 299 |
| A53 (invention) | 20.0 | 0.5 | 0.13 | 270 |
| A54 (invention) | 20.0 | 0.8 | 0.15 | 298 |
| A38 (invention) | 20.0 | 2.1 | 1.27 | 302 |
| A55 (invention) | 20.0 | 3.2 | 2.00 | 305 |
| A56 (invention) | 20.0 | 4.3 | 2.09 | 267 |

Lithium secondary batteries (i.e., present batteries A39 through A56) were manufactured in the same manner as in Experiment 1 except that the aforementioned composite oxide powders were used as the positive electrode active materials for the respective batteries. The respective batteries were subjected to the charge-discharge cycle test under the same conditions as in Experiment 1, and the results are also shown in Table 4 above. It is noted that Table 4 also lists the results obtained in the present batteries A35 through A38 shown in Table 3 for comparison.

On the basis of comparison in Table 4 between the present battery A39 and the present battery A40, between the present batteries A35, A42 and A43 and the present batteries A41 and A44, between the present batteries A36, A46 and A47 and the present batteries A45 and A48, between the present batteries A37, A50 and A51 and the present batteries A49 and A52, and between the present batteries A38, A54 and A65 and the present batteries A53 and A56, it is understood that a lithium secondary battery having an excellent charge-discharge cycle characteristic can be obtained when the composite oxide powder has a specific surface area measured by the BET method of 0.15 through 2.00 m²/g.

Obviously, numerous modifications and variations of the present invention are possible in light of the above teachings. It is therefore to be understood that within the scope of the appended claims the invention may be practiced otherwise than as specifically described herein.

What is claimed is:

1. A lithium secondary battery comprising, as a positive electrode active material, a composite oxide powder having a median diameter of 3.0 through 20.0 μm and a content of particles with a grain size of 1 μm or less of 10% by volume or less and being represented by a composition formula, $Li_aCo_bM_cNi_{1-b-c}O_2$, in which M is at least one element selected from the group consisting of Ca, Sc, V, Cu, Zn, Ga, Ge, Y, Nb, Ru, Rh, Pd, Ag, Cd, In and Sn; $0 \leq a \leq 1.2$; $0.01 \leq b \leq 0.4$; $0.01 \leq c \leq 0.4$; and $0.02 \leq b+c \leq 0.5$.

2. The lithium secondary battery according to claim 1, wherein the composite oxide powder has a specific surface area measured by a BET method of 0.15 through 2.00 m²/g.

3. A lithium secondary battery comprising, as a positive electrode active material, a composite oxide powder having a median diameter of 6.0 through 15.0 μm and a content of particles with a grain size of 1 μm or less of 10% by volume or less and being represented by a composition formula, $Li_aCo_bM_cNi_{1-b-c}O_2$, in which M is at least one element selected from the group consisting of Ca, Sc, V, Cu, Zn, Ga, Ge, Y, Nb, Ru, Rh, Pd, Ag, Cd, In and Sn; $0 \leq a \leq 1.2$; $0.01 \leq b \leq 0.4$; $0.01 \leq c \leq 0.4$; and $0.02 \leq b+c \leq 0.5$.

4. The lithium secondary battery according to claim 3, wherein the composite oxide powder has a specific surface area measured by a BET method of 0.15 through 2.00 m²/g.

5. A lithium secondary battery comprising, as a positive electrode active material, a composite oxide powder having a median diameter of 3.0 through 20.0 μm and a content of particles with a grain size of 1 μm or less of 10% by volume or less and being represented by a composition formula, $Li_aCo_bM_cNi_{1-b-c}O_2$, in which M is at least one element selected from the group consisting of Ca, V, Cu, Zn and Ga; $0 \leq a \leq 1.2$; $0.01 \leq b \leq 0.4$; $0.01 \leq c \leq 0.4$; and $0.02 \leq b+c \leq 0.5$.

6. The lithium secondary battery according to claim 5, wherein the composite oxide powder has a specific surface area measured by a BET method of 0.15 through 2.00 m²/g.

7. A lithium secondary battery comprising, as a positive electrode active material, a composite oxide powder having a median diameter of 6.0 through 15.0 μm and a content of particles with a grain size of 1 μm or less of 10% by volume or less and being represented by a composition formula, $Li_aCo_bM_cNi_{1-b-c}O_2$, in which M is at least one element selected from the group consisting of Ca, V, Cu, Zn and Ga; $0 \leq a \leq 1.2$; $0.01 \leq b \leq 0.4$; $0.01 \leq c \leq 0.4$; and $0.02 \leq b+c \leq 0.5$.

8. The lithium secondary battery according to claim 7, wherein the composite oxide powder has a specific surface area measured by a BET method of 0.15 through 2.00 m²/g.

9. A positive electrode active material, a composite oxide powder having a median diameter of 3.0 through 20.0 μm and a content of particles with a grain size of 1 μm or less of 10% by volume or less and being represented by a composition formula, $Li_aCo_bM_cNi_{1-b-c}O_2$, in which M is at least one element selected from the group consisting of Ca, Sc, V, Cu, Zn, Ga, Ge, Y, Nb, Ru, Rh, Pd, Ag, Cd, In and Sn; $0 \leq a \leq 1.2$; $0.01 \leq b \leq 0.4$; $0.01 \leq c \leq 0.4$; and $0.02 \leq b+c \leq 0.5$.

10. The positive electrode active material for a lithium secondary battery according to claim 9, wherein the composite oxide powder has a specific surface area measured by a BET method of 0.15 through 2.00 m²/g.

11. A positive electrode active material, a composite oxide powder having a median diameter of 6.0 through 15.0 μm and a content of particles with a grain size of 1 μm or less of 10% by volume or less and being represented by a composition formula, $Li_aCo_bM_cNi_{1-b-c}O_2$, in which M is at least one element selected from the group consisting of Ca, Sc, V, Cu, Zn, Ga, Ge, Y, Nb, Ru, Rh, Pd, Ag, Cd, In and Sn; $0 \leq a \leq 1.2$; $0.01 \leq b \leq 0.4$; $0.01 \leq c \leq 0.4$; and $0.02 \leq b+c \leq 0.5$.

12. The positive electrode active material for a lithium secondary battery according to claim 11,
wherein the composite oxide powder has a specific surface area measured by a BET method of 0.15 through 2.00 m²/g.

13. A positive electrode active material, a composite oxide powder having a median diameter of 3.0 through 20.0 μm and a content of particles with a grain size of 1 μm or less of 10% by volume or less and being represented by a composition formula, $Li_aCo_bM_cNi_{1-b-c}O_2$, in which M is at least one element selected from the group consisting of Ca, V, Cu, Zn and Ga; $0 \leq a \leq 1.2$; $0.01 \leq b \leq 0.4$; $0.01 \leq c \leq 0.4$; and $0.02 \leq b+c \leq 0.5$.

14. The positive electrode active material for a lithium secondary battery according to claim 13,
wherein the composite oxide powder has a specific surface area measured by a BET method of 0.15 through 2.00 m²/g.

15. A positive electrode active material, a composite oxide powder having a median diameter of 6.0 through 15.0 μm and a content of particles with a grain size of 1 μm or less of 10% by volume or less and being represented by a composition formula, $Li_aCo_bM_cNi_{1-b-c}O_2$, in which M is at least one element selected from the group consisting of Ca, V, Cu, Zn and Ga; $0 \leq a \leq 1.2$; $0.01 \leq b \leq 0.4$; $0.01 \leq c \leq 0.4$; and $0.02 \leq b+c \leq 0.5$.

16. The positive electrode active material for a lithium secondary battery according to claim 15,
wherein the composite oxide powder has a specific surface area measured by a BET method of 0.15 through 2.00 m²/g.

* * * * *